Dec. 22, 1964     W. E. MILLER     3,162,247
TRACTOR HITCH
Filed Sept. 18, 1961     2 Sheets-Sheet 1
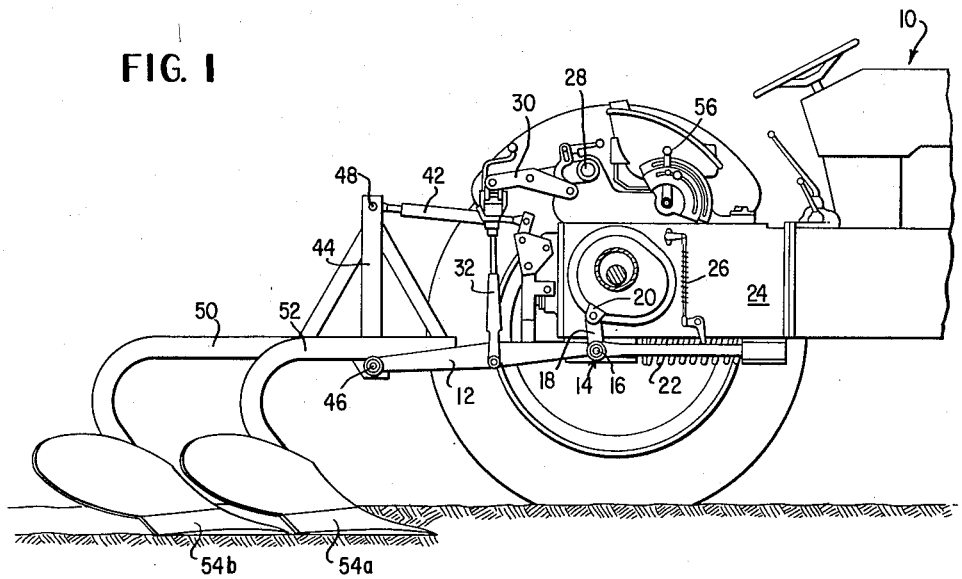
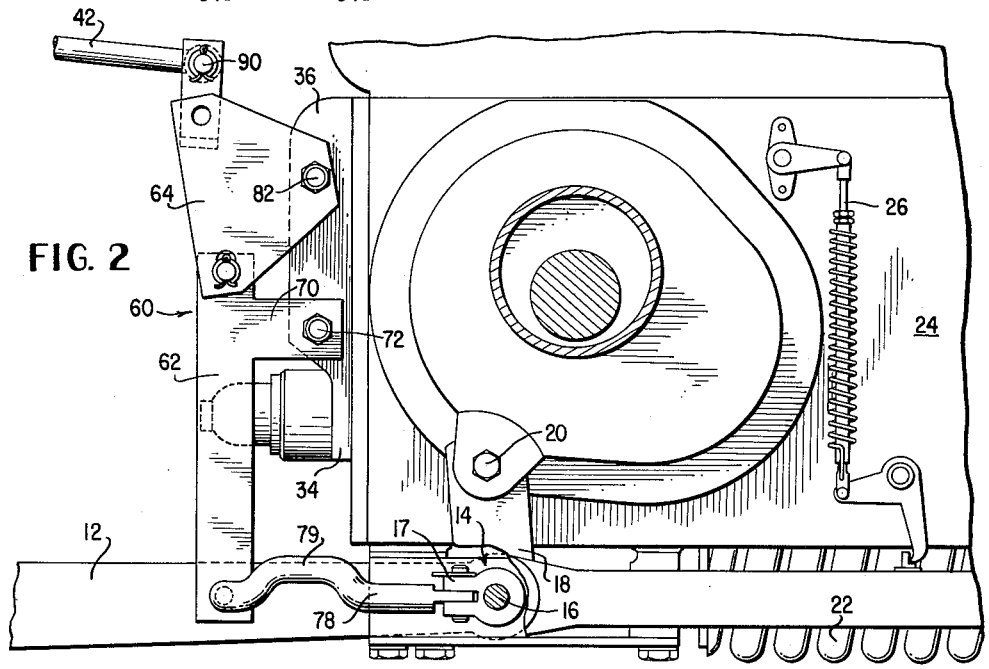
INVENTOR.
WILLIAM E. MILLER
BY Mead, Browne, Schuyler, Beveridge
ATTORNEYS.

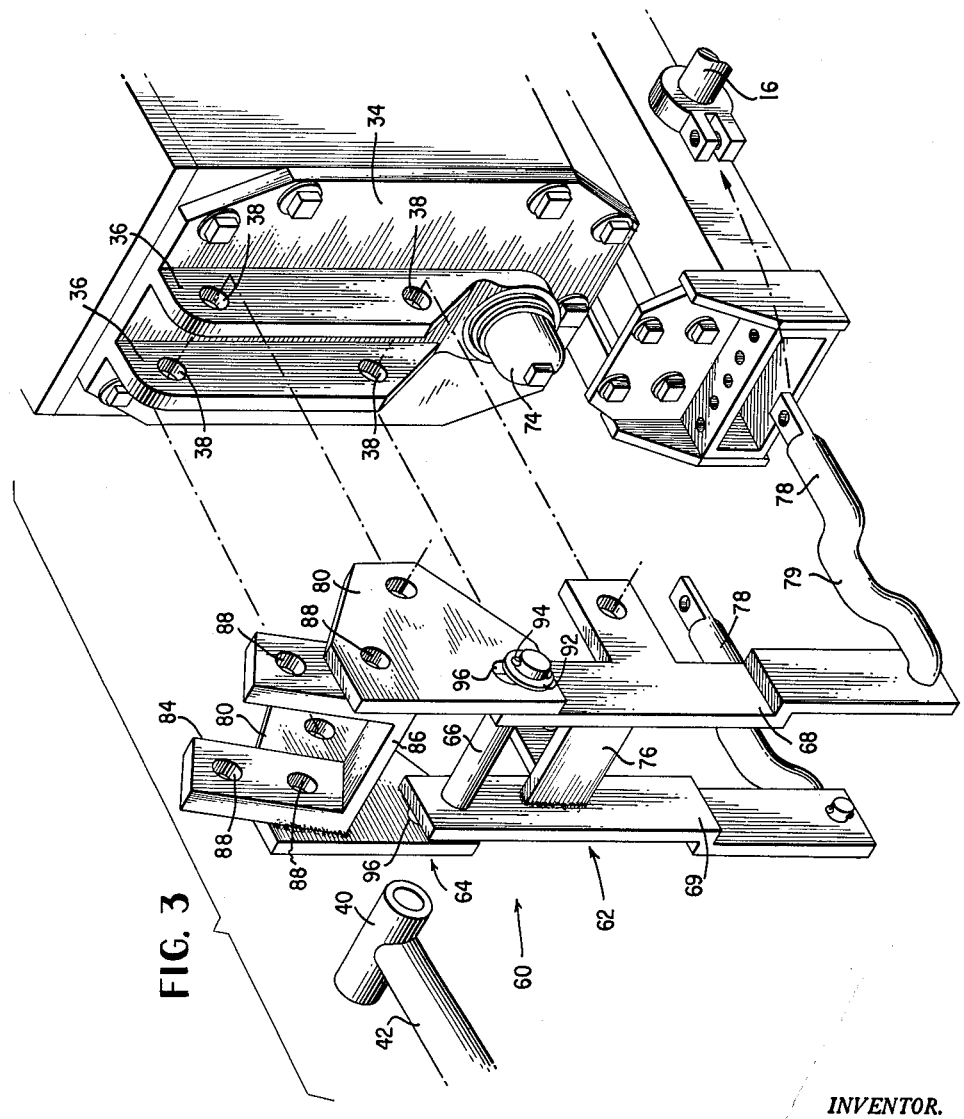

3,162,247
TRACTOR HITCH
William E. Miller, 2431 S. 13th St., Springfield, Ill.
Filed Sept. 18, 1961, Ser. No. 138,807
1 Claim. (Cl. 172—7)

This invention relates to tractor hitches, and more particularly to a hitching device for use on tractors having automatic draft control.

A number of tractors in current use employ the so-called three-point hitch for attaching implements to the tractor. The usual construction of such a hitch includes a pair of laterally spaced rearwardly extending draft links pivotally attached to the tractor at a point below the rear axle, and a centrally located rearwardly extending upper stabilizing link pivotally attached to the tractor at a point above the rear axle. In at least one such embodiment, the draft links are resiliently mounted for limited longitudinal movement relative to the tractor in response to variations in the draft load imposed on the links. Thus, when the draft load is increased, the draft links and their pivotal mounts will shift rearward against the force of a control spring, and be returned forward by the spring force when the load is decreased.

The draft load exerted by many implements, such as multiple bottom plows or the like, may be varied by rotation of the draft links in a vertical plane about their pivotal mounts, thereby lifting or lowering the implement and causing it to penetrate to a more shallow or deeper depth. The longitudinal movement of the draft links resulting from variations in load may be utilized to control an automatic draft control mechanism to vary the elevation of the links and thereby vary the draft load. In such an arrangement, any change in the draft load would cause longitudinal movement of the draft links which would be sensed by the draft control mechanism and the elevation of the links would be automatically changed to maintain a constant draft force.

While the above arrangement is satisfactory for most implements, it has been found that under some soil conditions a multiple bottom plow or the like may become unstable and tend to bob up and down, or penetrate to a varying depth.

It is an object of this invention to provide a hitching device for use on tractors having an automatic draft control which will permit the stable operation of draft implements, such as multiple bottom plows or the like, and eliminate bobbing of the implements in all soil conditions.

Another object of this invention is to provide a hitching device for use on tractors having an automatic draft control which will maintain the penetration angle of an attached implement substantially constant regardless of the magnitude of the draft force.

Another object of this invention is to provide a hitching device which will assure that each plow unit of a multiple bottom plow will penetrate the soil to the same depth during automatic draft control.

It is a further object of this invention to provide a hitching device for use on tractors having automatic draft control which can be easily and inexpensively manufactured, which may readily be installed on existing tractor designs without any modification thereof, and which will require little or no maintenance.

The above and other objects are achieved in a hitching device in which a pair of lever members are pivotally mounted on the back of the tractor, one above the other, with the adjacent ends of the levers hingedly connected. Pivotally connected to the bottom of the lower lever member is a pair of connecting members which extend forward and are attached to the resilient draft link pivots. The forward end of the stabilizing link of the three-point hitch is pivotally connected to the upper portion of the top lever member. Any movement of the draft links will result in a corresponding movement of the connecting members pivotally attached to the bottom of the lower lever member, causing this lower lever member to rotate about its pivotal mounting. This rotation of the lower lever member, acting through the hinged connection, will cause the top lever member to rotate in the opposite direction, thereby causing longitudinal movement of the stabilizing link of the three-point hitch in the same direction as that of the draft links.

Other objects and advantages of the invention will become apparent by reference to the following specifications taken in conjunction with the accompanying drawings.

In the drawings:

FIG. 1 is a side view of a multiple bottom plow connected, through a hitching device constructed in accordance with my invention, to the rear portion of a tractor shown in partial section;

FIG. 2 is an enlarged view of a portion of FIG. 1 showing the device installed on a tractor;

FIG. 3 is a perspective view of my hitching device showing the manner in which the device is attached to the tractor; and FIG. 4 is a fragmentary view showing an alternate construction of a portion of the device shown in FIG. 2.

Referring now to the drawings, FIG. 1 shows the rear portion of a tractor 10 having a three-point hitch and employing an automatic draft control. This three-point hitch includes a pair of rearwardly extending draft links 12 (only one of which is shown in FIG. 1) which are pivotally attached at their forward ends to connecting means 14 including a transversely extending shaft 16 on which is rotatably mounted a pair of clevis members 17. Connecting means 14 is mounted for fore-and-aft movement through a pair of drop links 18 pivoted to the tractor body as at 20. A pair of spring members 22 urges connecting means 14 in a forward direction in opposition to draft forces acting on links 12, thereby permitting fore-and-aft movement of links 12 in response to variation in draft load.

To maintain a uniform draft force on the tractor, a hydraulically operated, automatic draft control (not shown) is provided within the transmission housing 24 of tractor 10. A control linkage 26 senses movement of connecting means 14 resulting from variation in draft forces, and the automatic draft control acts to correct this change by appropriately raising or lowering the draft links and thereby changing the depth of penetration of the implement. The raising or lowering of the draft links is accomplished through the draft control output in the form of a transversely extending shaft 28 on which is mounted a pair of rearwardly extending lift arms 30 which are connected to draft links 12 by a pair of drop links 32.

Formed on the rear of the transmission housing cover plate 34 is a bracket 36 having a plurality of pivot holes 38. Bracket 36 is centered between, and located vertically above the pivotal mounts of draft links 12. In the prior art use of a three-point hitch, the forward end 40 of the stabilizing link 42 of the three-point hitch is pivotally mounted to one of these pivot holes 38. The rear end of draft links 12 and the stabilizing link 42 are pivotally connected to the rigid A-frame 44 at points 46 and 48 of an implement, such as the plow 50 shown in FIG. 1. In the usual construction of a multiple bottom plow illustrated in FIG. 1, the rigid A-frame 44 forms an integral part of the plow frame 52, on which is mounted a plurality of plow bottoms 54a and 54b, which are both laterally and longitudinally offset from each other, resulting in what is known as a "long" implement. The weight of the implement, combined with the construction of the individual plow bottoms, results in an inherent tendency to penetrate the ground as the implement is pulled forward. This inherent tendency to penetrate the ground is increased or decreased by variations in the penetration angle, or the angle between the plows and the surface of the ground. Thus, it can be seen by reference to FIG. 1 that rocking of the implement frame about a transverse axis will vary the angle at which the individual plows strike the ground. For example, a rearward movement of point 48 with respect to point 46 will result in a decreased tendency of the plows to penetrate the ground.

In the operation of the implement, the penetration of the individual plows into the ground results in a substantial draft force being developed in the draft links 12, causing these links to move rearward against the force of spring 22. This rearward movement of the draft links causes the implement to rock "forward," thereby increasing the tendency of the plows to penetrate the ground and increases the draft force, resulting in a further movement of the draft links. The rearward movement of the draft links is sensed by the automatic draft control which acts to rotate the output shaft 28 clockwise as viewed in FIG. 1, thereby rocking lift arms 30 upward and raising draft links 12 through drop links 32. The raising of draft links 12 will force the plows to penetrate to a more shallow depth, thereby reducing the draft force and permitting the draft links to move forward under the action of spring 22. This forward movement is sensed by the automatic draft control which stops the lifting action and the plow will assume a depth of penetration which will tend to result in a constant draft force. The magnitude of this draft force is under the manual control of the operator through a control lever 56.

The above arrangement has proven satisfactory for most implements, and under most soil conditions. However, it has been found that under certain soil conditions, and particularly in the operation of long multiple bottom plows, certain disadvantages may be encountered. For example, in such an implement the rocking motion of the implement frame resulting from longitudinal movement of the draft links will cause the individual plows to penetrate to different depths, due to the fact that the implement frame does not remain level with respect to the ground. Also the change in penetration angle due to this rocking movement of the implement frequently results in a tendency of the plow to bob up and down and penetrate to a varying depth.

The disadvantages of the above arrangement are overcome by a hitching device constructed in accordance with this invention whereby the stabilizing link 42 of the three-point hitch is caused to be moved in a fore-and-aft direction simultaneously with the draft links 12. This hitching device 60, best seen in FIG. 3, includes a lower lever member 62 which is pivotally mounted to bracket 36 at one of the sets of pivot holes 38, and an upper lever member 64 which is pivotally mounted to a second pair of pivot holes 38 located above member 62. The adjacent ends of members 62 and 64 are hingedly connected by pin 66.

Member 62 comprises a pair of parallel members 68 and 69, each having an integrally formed, forwardly extending portion 70 which is pivoted for rotation about a transverse axis to the bracket 36 by use of pivot bolt 72. Members 68 and 69 are spaced apart a distance sufficient to permit free access to the tractor power take-off 74, and are retained in their parallel spaced relation by member 76 which is rigidly attached, as by welding, to each of the members 68 and 69. Connected to the bottom of each of members 68 and 69 is a connecting member 78 which extends forward and is connected to clevis member 17. In addition to the three-point hitch described, some tractors in current use also have a fixed drawbar attachment (not shown) mounted on the rear of the tractor between the draft links and extending laterally beyond clevis member 17. To avoid the necessity of removing this drawbar attachment, connecting member 78 may be formed with a portion 79 intermediate its ends offset from the plane of the ends.

Lever member 64 comprises a pair of spaced parallel plates 80, each having a forwardly extending portion for pivotal mounting on bracket 36 by means of a transversely extending mounting bolt 82. A bracket member 84, including spacer member 86, is rigidly attached, as by welding, to each of the plates 80, thereby retaining the plates in their spaced parallel relation. A plurality of holes 88 are provided in members 84 and 80 to provide a means of pivotally connecting stabilizing link 42 by use of a transversely extending pin 90.

Lever members 62 and 64 are hingedly connected in overlapping relationship as shown in FIG. 3 by a transversely extending pin 66, retained against displacement by washers 92 and cotter pin 94. To provide for relative vertical movement between the two link members, resulting from their opposed rotation about their respective pivotal mountings, elongated slots are provided in plates 80 as shown at 96 in FIG. 3.

In operation, when the hitching device is interposed between the tractor and the plow as above described, any change in the draft load on links 12 will cause a longitudinal movement of connecting means 14 which, acting through links 78, will cause rotation of lever 62 about pivot 72. This rotation of lever 62, acting through pin 66, will cause lever 64 to be rotated in the opposite direction, thereby imparting longitudinal movement to link 42 in the same direction as that of the draft links 12. It can be readily seen that, by the mere expedient of properly proportioning the length of the two levers, any desired ratio of movement of link 42 relative to that of link 12 may be achieved. Thus, it has been found that in the operation of multiple bottom plows, if the ratio is made to be one to one, the implement will undergo pure translation as a result of variation in draft load, thereby eliminating the fore-and-aft rocking which results when only the draft links are permitted to move longitudinally. The elimination of this rocking action permits stable operation of the implement, free from the tendency to bob up and down. This stabilizing effect is the result of the implement remaining "level" with respect to the ground, thereby maintaining a constant penetration angle regardless of the draft load.

In an alternate configuration, shown in FIG. 4, the means of connecting the lower end of lever member 62 to the connecting means 14 comprises a pair of forwardly extending members 100 rigidly attached, as by welding, to the lower end of member 62 as shown at 102. The cross sectional shape and area of members 100 are such that they are capable of transmitting large forces along their longitudinal axis while being sufficiently flexible in bending to permit the limited rotation of member 62 and the slight vertical movement of connecting means 14 resulting from the pivotal movement of drop links 18.

While I have described but two embodiments of my invention, it will be apparent that these disclosed embodiments may be modified. Therefore, the foregoing description is to be considered exemplary rather than limiting, and the true scope of my invention is that defined in the following claim.

What I claim is:

A hitching device for use on a tractor of the type having a three point hitch including an elongated shaft extending transversely beneath said tractor, linkage means pivotally supporting said shaft on said tractor for limited movement fore and aft thereof, spring means urging said shaft forward with respect to said tractor, a pair of elongated laterally spaced rearward extending draft links having their respective forward ends pivotally connected near the opposite ends of said shaft, means sensing fore and aft movement of said shaft, means responsive to said sensing means for pivoting said draft links about said shaft to vary the elevation of the rearward ends of said links, a draft bracket formed on the rear of said tractor, said bracket including a pair of elongated vertically extending webs projecting rearward from said tractor, a plurality of vertically spaced openings extending through each of said webs, the openings in each of said webs being symmetrical and disposed transversely opposite to one another to form a plurality of vertically spaced pairs of pivotal openings, an elongated rearwardly extending stabilizing link having one end operatively connected to one of said pairs of vertically spaced pivotal openings, said hitching device comprising a first lever member pivotally mounted on the rear of said tractor for limited rotation about a horizontal axis parallel to the axis of said shaft, said first lever member including a pair of generally vertically extending substantially parallel laterally spaced arms each having a forwardly extending portion intermediate its ends, pin means pivotally mounting said forwardly extending portions to a first pair of said pivotal openings, a second lever member pivotally mounted on the rear of said tractor for limited rotation about a horizontal axis parallel to the axis of said shaft, said second lever member including a pair of generally vertically extending substantially parallel laterally spaced arms each having a forwardly extending portion intermediate its ends, pin means pivotally mounting said forward extending portions of said second lever member to another of said pairs of pivotal openings, said second lever member being mounted in a pair of pivotal openings vertically above said first pair of pivotal openings, pin means pivotally mounting the forward end of said stabilizing link between said vertical arms of said second lever member adjacent the top thereof, means hingedly connecting the upper end of said first lever member to the lower end of said second lever member, and a pair of elongated substantially horizontal connecting arms having their respective rearward ends pivotally connected to the bottom end of one of said spaced arms of said first lever member and each having its forward end connected to said shaft for fore and aft movement therewith.

References Cited in the file of this patent
UNITED STATES PATENTS

| | | |
|---|---|---|
| 2,822,738 | Smith | Feb. 11, 1958 |
| 2,844,083 | Du Shane | July 22, 1958 |
| 2,874,789 | Hershman | Feb. 24, 1959 |
| 2,968,353 | Edman | Jan. 17, 1961 |